350-96.3

XR 3,615,312

United Sta[tes Patent] [11] 3,615,312

[72] Inventors Rober[t]
Sturbr[idge;]
Amadee D. Marino, Southbridge, both of Mass.
[21] Appl. No. 817,832
[22] Filed Apr. 21, 1969
[45] Patented Oct. 26, 1971
[73] Assignee American Optical Corporation
Southbridge, Mass.

[54] END FUSION OF GLASS LASER RODS OF DISSIMILAR CHEMISTRY
9 Claims, 3 Drawing Figs.
[52] U.S. Cl. ................................................. 65/4,
65/37, 65/38, 65/DIG. 7, 65/42, 65/60, 65/111, 65/155,
331/94.5, 350/96
[51] Int. Cl. ........................................................ C03c 23/20,
H01s 3/00, C02b 5/14
[50] Field of Search .............................................. 65/4, DIG.
7, 37, 38, 42, 60, 111, 155

References Cited
UNITED STATES PATENTS

| | | | |
|---|---|---|---|
| 1,793,529 | 2/1931 | Taylor | 65/4 X |
| 2,313,296 | 3/1943 | Lamesch | 65/4 X |
| 2,992,517 | 7/1961 | Hicks, Jr. | 65/4 X |
| 3,037,241 | 6/1962 | Bazinet, Jr. et al. | 65/4 X |
| 3,193,364 | 7/1965 | Granitsas | 65/4 |
| 3,278,283 | 10/1966 | Bazinet, Jr. | 65/4 |
| 3,449,036 | 6/1969 | Jacobsen | 65/4 X |
| 3,455,667 | 7/1969 | Snitzer et al. | 65/4 |
| 3,483,072 | 12/1969 | Cox et al. | 65/DIG. 7 |

*Primary Examiner*—Frank W. Miga
*Attorneys*—William C. Nealon, Noble S. Williams and Robert J. Bird ABSTRACT: Method of operatively end fusing dissimilar rare earth oxide doped laser glass into an operatively unitary laser device, and product of the method.

3615312
NO OR CLASSIF

PATENTED OCT 26 1971 3,615,312

INVENTOR.
ROBERT J. LANDRY
AMADEE D. MARINO
BY William C. Nesler
ATTORNEY

END FUSION OF GLASS LASER RODS OF DISSIMILAR CHEMISTRY

BACKGROUND

Lasers, otherwise referred to as optical masers by some, are light amplifying, or light oscillation producing devices, and are specifically adapted to provide an output of high-intensity coherent monochromatic light. Such light is produced in a laser by photonic emission from the active ions or atoms of a body composed of so-called laser material. The present invention is especially concerned with lasers of the glass type which are doped with certain rare earth oxides. A full background discussion of this type of laser may be found, for example, in copending U.S. application Ser. No. 168,012 of Elias Snitzer, filed Jan. 16, 1962 and owned by the same assignee as the instant application. The disclosure thereof is incorporated herein by reference.

There are applications in some laser systems where it may be desirable to couple two or more laser rods of dissimilar doping. Prior methods of accomplishing such an arrangement comprised optically aligning the rods visually or with optical sensors including use of auto collimators. Not only is such an arrangement or approach to coupling very difficult and time consuming but it is extremely difficult to obtain precisely the same alignment each time the system is set up. Thus, reproducibility is always questionable. In some instances the optical quality of the dissimilar rods is so unsatisfactory due to striae, bubbles, etc. that visual alignment is nearly impossible. Yet further, there is about a 4 percent Fresnel loss from the glass-air-glass interface.

OBJECT OF THE INVENTION

It is a primary object of this invention to provide a method and product of that method for producing axially coupled optically aligned laser rods of dissimilar active ingredients.

THE DRAWINGS

DETAILED DISCLOSURE OF THE INVENTION

According to this invention there is provided a technique for end coupling by fusing in an optically aligned arrangement two chemically dissimilar laser glasses. As used herein "laser glasses" refers to glass lasers of the type disclosed and claimed in the Snitzer application Ser. No. 168,012 mentioned above.

When two pieces of glass of different coefficients of expansion and different melting temperatures are end fused together the fusion interface usually contains a great deal of strain. If the glasses are in the form of rods and the fusion interface is made on the abutting ends of the rods, especially where the diameter of the rods is considerably less than the length thereof, the fusion interface is so weak that it has a propensity for breaking at the interface quite easily. According to the present invention this problem is overcome.

Figure 1:
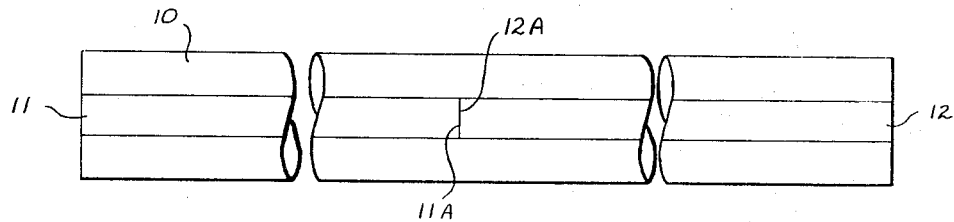
FIG. 1 is a schematic side elevational view of an assembly of parts used in the practice of the invention.

In FIG. 1 there is shown a tubular piece of cladding 10 having contained therein two core rods 11 and 12. External surfaces of the core rods are fire-polished and the ends 11a and 12a are optically polished and placed in contiguous contact. In a specific example the cladding 10 is a glass cylinder 13 inches long and 1 inch in diameter. Core 1 is 5 inches in length and 0.499 inches in diameter. Rod 12 is 7 inches in length and 0.499 inches in diameter. The outside diameter of the passage through the cladding 10 is 0.571 inches.

The cladding 10 and the core 12 are laser base glass of the type disclosed in the Snitzer application identified above. The coefficient of thermal expansion in the particular example being described herein, for such, the base glass was $13.18 \times 10^{-6}$ cm./° C. and the melting temperature thereof was 11.38 cm./° F. The core 11 was neodymium doped laser glass made according to the Snitzer application identified above having a coefficient of thermal expansion of $13.10 \times 10^{16}$ cm./° C. with a melting point of 11.46 cm./° F.

The arrangement of FIG. 1 was subjected to a first heat treatment drawing step in a conventional manner under reduced pressure. In actual practice we draw a vacuum of 15 pounds. The end of the arrangement of FIG. 1 including the rod 11 was drawn first since it included the higher melting temperature material. By the time the core 12 was subjected to maximum furnace temperature the interface between ends 11a and 12d was at a temperature high enough to assure excellent fusion. When we reversed the procedure just described and drew with core 12 first into the furnace we could not get the desired join, i.e. the interface between abutting ends was pulled apart during the drawing process without the desired tapering through the join.

Figure 2:
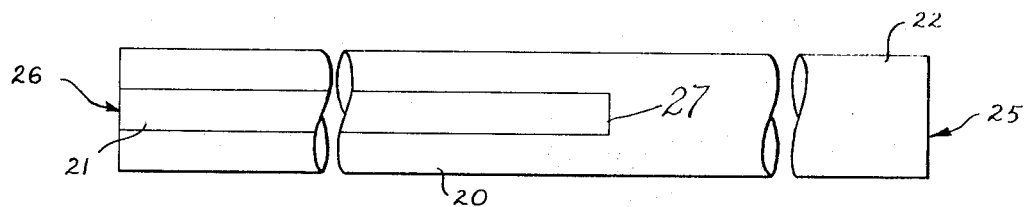
FIG. 2 is a schematic diagram of the elements of FIG. 1 at a first treatment stage in the practice of the method of this invention.

When completed the arrangement of FIG. 2 resulted and consisted of a one-piece polished rod 20 having core 21 of chemistry identical to rod 11 while the remainder 22 was of chemistry comparable to the core 12 and cladding 10 of FIG. 1.

The method just described is especially desirable where one wishes to pump such as an erbium glass laser with a neodymium doped laser. The cladding over both the erbium and that which effectively operates as the neodymium laser is made from neodymium glass. In such an arrangement, the erbium is not only pumped from the laser output of the adjacent end of the neodymium rod but also from the sides as the result of neodymium fluorescence in the cladding.

THE SECOND DRAWING STEP

The arrangement of FIG. 2 is an operational laser device or rod. However, due to the much larger diameter of end 25 as compared to the end 26 of the core 21 there is undesirable energy loss. For example, light oscillating through the rod 21 diverges as it travels towards end 25 and some portion thereof is internally reflected. Thus, light rays reflected from end 25 may be lost to the cladding circumferentially of the rod 21. To overcome this and greatly increase the efficiency of the system the arrangement of FIG. 2 is subjected to a second drawing step in which the end 25 is reduced to a diameter substantially equivalent to the diameter of the end 26 of the core 21. This operation is successfully completed in a melting operation of the type described above and in which the drawing operation is stopped just before core 21 enters the furnace. This is necessary to assure that core 21 does not taper to a cone. Thus, light emitting from end 27 of core 26 will enter the body of that portion of the assembly 22 of comparable diameter and be substantially entirely reflected back into the core 21.

Figure 3:
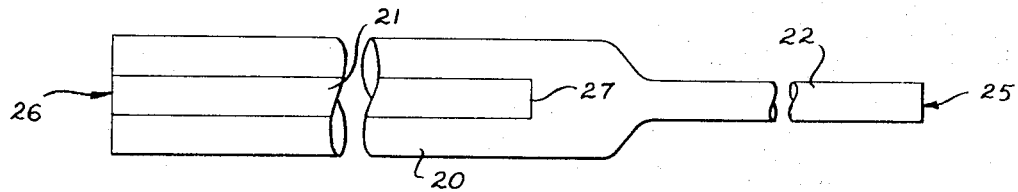
FIG. 3 is a view of the arrangement of FIG. 2 after subjecting it to an additional and preferable second treatment step.

The ends of the laser arrangement of FIGS. 2 and 3 and the end 27 of the core 21 are substantially flat and parallel. In use, the rod or element of FIGS. 2 and 3 is arranged with suitable reflecting devices or equivalents which allow one to internally oscillate pumped energy.

In the above discussion we have called for the arrangement of FIG. 1 to include a cylindrical tube of unspecified cross section. It is preferable that all elements be circular in cross section. However, this is not necessary. In practice we frequently have cores which are square in cross section which can then be end abutted and placed within a cylindrical glass tube of cladding material which could be circular, square, etc. The drawing step fuses the elements together and in so doing conforms the shapes thereof.

Almost any operable combination of rare-earth-oxide-doped-glass laser materials (having the required variations in energy level) and of the various types disclosed in the Snitzer application mentioned above can be utilized. Another example calls for core 11 to be erbium doped glass, core 2 to be neodymium doped glass with cladding 10 being neodymium-ytterbium doped material. Other variations are possible within the purview of the skilled physicist and can be fabricated utilizing the concepts of the present invention. The end result, however, is a unitary device which operates as a single laser having a single resonant cavity.

In the foregoing discussion we have described our method as applicable to two rods or cores. The technique is equally applicable to three rods or cores or more. The cores are aligned stepwise according to melting points and in which the highest melting material is first decreasing to the lowestmost last. Alternatively, a single rod of laser material may have a bore drilled centrally thereof into which may be inserted a glass laser rod of doping chemistry different than the single rod. The configuration of such a structure would be very similar to FIG. 1 except the cladding 10 and rod 12 would be integral. The structures of FIGS. 1 and 2 should be annealed in a conventional manner.

One of the more important results of practice of this invention is the substantial elimination of Fresnel losses of the type discussed above relative to glass-air-glass interface. Tests of a rod constructed as described in the example above substantiated this aspect of the invention.

Having thus described the invention in detail and with sufficient particularity as to enable those skilled in the art to practice it, what is desired to have protected by letters patent is set forth in the following claims:

We claim:

1. That method of coupling a plurality of differently doped laser glass pieces, including at least a first piece and a second piece, comprising preparing a plurality of differently doped glass pieces along a common longitudinal axis in abutting relationship, the first piece having a higher melting point then the second piece, subsequent pieces being arranged in order of decreasing melting point, their being cladding about at least one of said pieces, subjecting the foregoing assembly of cladding and pieces to a drawing step in which the highest melting point piece is subjected to a drawing furnace first, continuing the drawing until a unitary laser structing results in which the pieces have respective abutting ends fused and external surfaces of the pieces are conformed to and fused with the cladding.

2. The product of the method in claim 1.

3. The process of claim 1 which the pieces consist of a pair of laser rods, the second of which is erbium doped and the first of which is neodymium doped and in which the cladding is likewise neodymium doped.

4. The method of claim 1 in which the pieces are of circular cross section.

5. The method of claim 4 in which the cladding material is initially a neodymium doped open-ended cylinder of circular cross section.

6. The method of claim 1 in which the second piece is erbium doped, and the first is neodymium doped and the cladding is neodymium-ytterbium doped.

7. The method of claim 1 in which the unitary laser structure is subjected to a second drawing step for at least a portion of its length.

8. The method of claim 7 in which there are two pieces, the second piece being erbium doped and the first neodymium doped, the cladding also being neodymium doped, and in which the unitary laser structure is subjected to a second drawing step but for less than the portion of its length comprised of the first doped piece.

9. The method of claim 1 in which said pieces are separate rod elements and in which the external surfaces of said rods are polished, and abutting ends thereof being polished and parallel, inserting said rods into a separate cylinder of laser-rod-cladding material, respective adjacent ends of the plurality of rods contiguously abutting each other.